(12) United States Patent
Zhang

(10) Patent No.: US 11,245,448 B2
(45) Date of Patent: Feb. 8, 2022

(54) ANTENNA CONNECTION DETECTION METHOD AND APPARATUS

(71) Applicant: HUAWEI TECHNOLOGIES CO., LTD., Guangdong (CN)

(72) Inventor: Pengcheng Zhang, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/144,775

(22) Filed: Jan. 8, 2021

(65) Prior Publication Data

US 2021/0135720 A1 May 6, 2021

Related U.S. Application Data

(63) Continuation of application No. PCT/CN2019/086714, filed on May 13, 2019.

(30) Foreign Application Priority Data

Jul. 9, 2018 (CN) .......................... 201810744524.X

(51) Int. Cl.
*H01Q 1/24* (2006.01)
*H04B 7/0456* (2017.01)
*H04L 5/00* (2006.01)

(52) U.S. Cl.
CPC ......... *H04B 7/0469* (2013.01); *H04L 5/0048* (2013.01); *H01Q 1/246* (2013.01)

(58) Field of Classification Search
CPC .. H04B 7/0456; H04B 7/0626; H04B 7/0617; H04B 7/0417; H04B 7/06; H04B 7/0695;
(Continued)

(56) References Cited

U.S. PATENT DOCUMENTS 5,410,748 A * 4/1995 Hayashi ............... H04B 7/0811
455/135
2004/0116084 A1* 6/2004 Ward ..................... H01Q 23/00
455/130

(Continued)

FOREIGN PATENT DOCUMENTS

CN 101154977 A 4/2008
CN 101340687 A 1/2009
(Continued)

OTHER PUBLICATIONS

Extended European Search Report issued in European Application No. 19834227.1 dated Jun. 25, 2021, 9 pages.
(Continued)

*Primary Examiner* — Eva Y Puente
(74) *Attorney, Agent, or Firm* — Fish & Richardson P.C.

(57) ABSTRACT

An antenna connection detection method and apparatus are provided, to detect whether a connection sequence between communications interfaces of a network side device and antenna elements is incorrect. The method includes that a network side device receives, by using antenna elements connected to a plurality of communications interfaces, reference signals sent by N terminal devices, where N is an integer greater than 0. Then, the network side device determines N channel correlation matrices based on the reference signals sent by the N terminal devices, and then determines, based on the N channel correlation matrices and a preset channel correlation matrix, whether a connection sequence between the plurality of communications interfaces and the antenna elements is incorrect, where one channel correlation matrix is used to represent correlation between transmission channels between the network side device and one terminal device.

16 Claims, 7 Drawing Sheets

(58) Field of Classification Search
CPC ...... H04B 17/318; H04B 7/04; H04B 17/309;
H04B 7/0413; H04B 7/0478; H04B
7/0639; H04B 7/0469; H01Q 1/246;
H01Q 21/28; H01Q 1/04; H01Q 1/44;
H01Q 3/46; H01Q 19/09; H01Q 3/20;
H01Q 3/44; H01Q 1/243; H01Q 1/364;
H01Q 21/0006; H01Q 21/0025; H01Q
21/26; G06N 20/10; G06N 3/08; G06N
3/04; G06N 3/0454; G06N 3/088; G06N
20/00; G06N 3/02; G06N 3/063; G06N
5/04; G06N 7/005; F21S 8/086; F21W
2131/103
USPC .......................................................... 375/267
See application file for complete search history.

(56) References Cited

U.S. PATENT DOCUMENTS

| | | | |
|---|---|---|---|
| 2009/0079879 A1* | 3/2009 | Adachi | H04N 5/50 348/725 |
| 2012/0064838 A1 | 3/2012 | Miao et al. | |
| 2014/0185813 A1* | 7/2014 | Ozden | H04R 25/70 381/23.1 |
| 2015/0358055 A1 | 12/2015 | Molisch et al. | |
| 2016/0099505 A1* | 4/2016 | Junttila | H01Q 19/10 455/562.1 |
| 2018/0062722 A1* | 3/2018 | Su | H04B 7/0626 |
| 2018/0123654 A1 | 5/2018 | Park et al. | |
| 2019/0036563 A1* | 1/2019 | Koshy | H04W 52/267 |

FOREIGN PATENT DOCUMENTS

| | | |
|---|---|---|
| CN | 102549950 A | 7/2012 |
| CN | 104202073 A | 12/2014 |
| CN | 105721072 A | 6/2016 |
| CN | 106685501 A | 5/2017 |
| CN | 106921422 A | 7/2017 |
| CN | 107315183 A | 11/2017 |
| WO | 2010055084 A2 | 5/2010 |

OTHER PUBLICATIONS

Office Action issued in Chinese Application No. 201810744524.X dated Nov. 18, 2020, 4 pages.
Office Action issued in Chinese Application No. 201810744524.X dated May 25, 2020, 10 pages (with English translation).
PCT International Search Report and Written Opinion issued in International Application No. PCT/CN2019/086714 dated Jul. 17, 2019, 15 pages (with English translation).

* cited by examiner

ANTENNA CONNECTION DETECTION METHOD AND APPARATUS

CROSS-REFERENCE TO RELATED APPLICATIONS

This application is a continuation of International Application No. PCT/CN2019/086714, filed on May 13, 2019, which claims priority to Chinese Patent Application No. 201810744524.X, filed on Jul. 9, 2018. The disclosures of the aforementioned applications are hereby incorporated by reference in their entireties.

TECHNICAL FIELD

This application relates to the field of communications technologies, and in particular, to an antenna connection detection method and apparatus.

BACKGROUND

In a multiple-input multiple-output (MIMO) system, a base station includes a plurality of communications interfaces, and each communications interface is connected to one antenna element in an active antenna system (AAS). An 8T8R base station is used as an example. As shown in FIG. 1, the base station includes eight communications interfaces, namely, Trx1 to Trx8, and Trx1 to Trx8 are respectively connected to antenna elements A1 to A8 in the AAS. A signal is transmitted between the base station and a terminal device through a transmission channel including a communications interface of the base station, an antenna element, and a communications interface of the terminal device. In a downlink signal transmission process, the base station outputs a signal through the communications interface of the base station, and then sends the signal to the terminal device by using the antenna element. In an uplink data transmission process, the base station receives, by using the antenna element, a signal sent by the terminal device, and then inputs the signal into the base station through the communications interface of the base station.

When the base station includes a relatively large quantity of communications interfaces, a problem may occur when the communications interfaces are connected to the antenna elements in the AAS. For example, in the base station shown in FIG. 1, Trx5 needs to be connected to an A5 antenna element, and Trx2 needs to be connected to an A2 antenna element. However, when the communications interfaces and the antenna elements are connected, Trx5 may be incorrectly connected to the A2 antenna element, and the Trx2 may be incorrectly connected to the A5 antenna element, as shown in FIG. 2. When the problem occurs when the communications interfaces are connected to the antenna elements in the AAS, beamforming of the AAS is abnormal. Consequently, directivity of a transmit beam formed in the AAS deteriorates, and network performance deteriorates.

SUMMARY

This application provides an antenna connection detection method and apparatus, to detect whether a connection sequence between communications interfaces of a network side device and antenna elements is incorrect.

According to a first aspect, this application provides an antenna connection detection method, where the method is applied to a network side device, the network side device includes a plurality of communications interfaces, one communications interface is connected to one antenna element, and the method includes: The network side device receives, by using the antenna elements connected to the plurality of communications interfaces, reference signals sent by N terminal devices, determines N channel correlation matrices based on the reference signals sent by the N terminal devices, where N is an integer greater than 0, and one channel correlation matrix is used to represent correlation between transmission channels between the network side device and one terminal device, and determines, based on the N channel correlation matrices and a preset channel correlation matrix, whether a connection sequence between the plurality of communications interfaces and the antenna elements is incorrect.

In this embodiment of this application, the network side device may detect, by using the reference signals sent by the terminal devices, whether the connection sequence between the communications interfaces of the network side device and the antenna elements is incorrect, so that an incorrect connection relationship can be corrected in a timely manner. In this way, when forming a transmit beam based on downlink channel information corresponding to the correct connection sequence, the network side device can maintain relatively good network performance.

For example, in a base station shown in FIG. 1, Trx5 needs to be connected to an A5 antenna element, and Trx2 needs to be connected to an A2 antenna element. However, when the communications interfaces and the antenna elements are connected, Trx5 is incorrectly connected to the A2 antenna element, and Trx2 is incorrectly connected to the A5 antenna element, as shown in FIG. 2. Then, the base station that uses the connection mode shown in FIG. 2 receives, by using the antenna elements, the reference signals sent by the terminal devices, and may determine, based on the channel correlation matrices that are determined based on the reference signals and the preset channel correlation matrix, that the connection sequence between the communications interfaces of the base station and the antenna elements is incorrect. In this way, the base station can prompt engineering personnel to check and correct the connection sequence between the communications interfaces and the antenna elements. Therefore, a problem that directivity of the transmit beam is poor and network performance is reduced because an exception is caused when the base station forms beamforming can be avoided to some extent, so that the base station can maintain good network performance.

In a possible design, that the network side device determines the N channel correlation matrices based on the reference signals sent by the N terminal devices includes: The network side device determines an $i^{th}$ channel response matrix based on a reference signal sent by an $i^{th}$ terminal device, and determines an $i^{th}$ channel correlation matrix based on the $i^{th}$ channel response matrix, where the $i^{th}$ channel response matrix includes response coefficients of transmission channels between the network side device and the $i^{th}$ terminal device, and i is any positive integer not greater than N; and the $i^{th}$ channel correlation matrix is used to represent correlation between the transmission channels between the network side device and the $i^{th}$ terminal device.

In the foregoing design, the network side device may determine the channel response matrix based on the reference signal, to determine the correlation between the transmission channels based on the channel response matrix, so that whether the connection sequence between the communications interfaces and the antenna elements is incorrect can be detected based on the correlation between the transmission channels.

In a possible design, that the network side device determines the $i^{th}$ channel correlation matrix based on the it channel response matrix includes: The network side device multiplies a conjugate transpose matrix of the $i^{th}$ channel response matrix by the $i^{th}$ channel response matrix, to obtain the $i^{th}$ channel correlation matrix.

In the foregoing design, the network side device can relatively accurately determine the channel correlation matrix, to improve accuracy of detecting whether the connection sequence between the communications interfaces and the antenna elements is incorrect.

In a possible design, N is equal to 1, and that the network side device determines, based on the N channel correlation matrices and the preset channel correlation matrix, whether the connection sequence between the plurality of communications interfaces and the antenna elements is incorrect includes: The network side device performs diagonal normalization processing on one channel correlation matrix to obtain a normalized matrix; the network side device compares the normalized matrix with the preset channel correlation matrix; and if an error between at least one array element in the normalized matrix and an array element at a same location in the preset channel correlation matrix is not within an error range, the network side device determines that the connection sequence between the plurality of communications interfaces and the antenna elements is incorrect; or if errors between array elements in the normalized matrix and array elements at a same location in the preset channel correlation matrix are all within an error range, the network side device determines that the connection sequence between the plurality of communications interfaces and the antenna elements is correct.

In the foregoing design, the network side device may detect, based on a reference signal sent by one terminal device, whether the connection sequence between the communications interfaces and the antenna elements is incorrect. In addition, a channel correlation matrix corresponding to the terminal device is normalized, so that accuracy of detecting whether the connection sequence between the communications interfaces and the antenna elements is incorrect can be improved.

In a possible design, N is greater than 1, and that the network side device determines, based on the N channel correlation matrices and the preset channel correlation matrix, whether the connection sequence between the plurality of communications interfaces and the antenna elements is incorrect includes: The network side device determines a statistical distribution feature of the N channel correlation matrices to obtain a statistical distribution feature matrix; the network side device performs diagonal normalization processing on the statistical distribution feature matrix to obtain a normalized matrix; the network side device compares the normalized matrix with the preset channel correlation matrix; and if an error between at least one array element in the normalized matrix and an array element at a same location in the preset channel correlation matrix is not within an error range, the network side device determines that the connection sequence between the plurality of communications interfaces and the antenna elements is incorrect; or if errors between the array elements in the normalized matrix and the array elements at a same location in the preset channel correlation matrix are all within an error range, the network side device determines that the connection sequence between the plurality of communications interfaces and the antenna elements is correct.

In the foregoing design, the network side device determines the statistical distribution feature of the plurality of channel correlation matrices, to reduce, to some extent, impact of channel noise between the antenna elements of the network side device and the terminal device on detecting the connection sequence between the communications interfaces and the antenna elements, thereby improving accuracy of detecting whether the connection sequence between the communications interfaces and the antenna elements is incorrect.

In a possible design, the preset channel correlation matrix may be the following matrix:

$$\begin{bmatrix} A\left(\frac{M}{2} \times \frac{M}{2}\right) & B\left(\frac{M}{2} \times \frac{M}{2}\right) \\ B\left(\frac{M}{2} \times \frac{M}{2}\right) & A\left(\frac{M}{2} \times \frac{M}{2}\right) \end{bmatrix},$$

where $$A\left(\frac{M}{2} \times \frac{M}{2}\right)$$

is a correlation matrix between co-polarized antenna columns, M is a quantity of communications interfaces, and $$B\left(\frac{M}{2} \times \frac{M}{2}\right)$$

is a correlation matrix between cross-polarized antenna columns.

In the foregoing design, the network side device compares the array element in the determined channel correlation matrix with an array element in the correlation matrix between the co-polarized antenna columns and an array element in the correlation matrix between the cross-polarized antenna columns, to accurately detect whether the connection sequence between the communications interfaces of the network side device and the antenna elements.

In a possible design, $$A\left(\frac{M}{2} \times \frac{M}{2}\right)$$

may conform to the following matrix:

$$\begin{bmatrix} 1 & \alpha & \cdots & \alpha^{\frac{M}{2}-1} \\ \alpha & 1 & \ddots & \vdots \\ \vdots & \ddots & 1 & \alpha \\ \alpha^{\frac{M}{2}-1} & \cdots & \alpha & 1 \end{bmatrix},$$

where $\alpha$ is a correlation coefficient between adjacent co-polarized antenna columns.

In a possible design, $$B\left(\frac{M}{2} \times \frac{M}{2}\right)$$

may be a matrix in which all array elements are β, and β may be a correlation coefficient between any two cross-polarized antenna columns.

According to a second aspect, this application provides an antenna connection detection apparatus, where the apparatus is applied to a network side device, the network side device includes a plurality of communications interfaces, one communications interface is connected to one antenna element, and the apparatus includes: a receiving unit, configured to receive, by using the antenna elements connected to the plurality of communications interfaces, reference signals sent by N terminal devices, where N is an integer greater than 0; and a processing unit, configured to: determine N channel correlation matrices based on the reference signals that are sent by the N terminal devices and that are received by the receiving unit; and determine, based on the N channel correlation matrices and a preset channel correlation matrix, whether a connection sequence between the plurality of communications interfaces and the antenna elements is incorrect, where one channel correlation matrix is used to represent correlation between transmission channels between the network side device and one terminal device.

In a possible design, when the processing unit is configured to determine the N channel correlation matrices based on the reference signals sent by the N terminal devices, the processing unit may be specifically configured to: determine an $i^{th}$ channel response matrix based on a reference signal sent by an $i^{th}$ terminal device, where the $i^{th}$ channel response matrix includes response coefficients of transmission channels between the network side device and the $i^{th}$ terminal device, and i is any positive integer not greater than N; and determine an $i^{th}$ channel correlation matrix based on the $i^{th}$ channel response matrix, where the $i^{th}$ channel correlation matrix is used to represent correlation between the transmission channels between the network side device and the $i^{th}$ terminal device.

In a possible design, when the processing unit is configured to determine the $i^{th}$ channel correlation matrix based on the $i^{th}$ channel response matrix, the processing unit may be specifically configured to: multiply a conjugate transpose matrix of the $i^{th}$ channel response matrix by the $i^{th}$ channel response matrix, to obtain the $i^{th}$ channel correlation matrix.

In a possible design. N is equal to 1, and when the processing unit is configured to determine, based on the N channel correlation matrices and the preset channel correlation matrix, whether the connection sequence between the plurality of communications interfaces and the antenna elements is incorrect, the processing unit may be specifically configured to: perform diagonal normalization processing on one channel correlation matrix to obtain a normalized matrix; compare the normalized matrix with the preset channel correlation matrix; and if an error between at least one array element in the normalized matrix and an array element at a same location in the preset channel correlation matrix is not within an error range, determine that the connection sequence between the plurality of communications interfaces and the antenna elements is incorrect.

In a possible design, N is greater than 1, and when the processing unit is configured to determine, based on the N channel correlation matrices and the preset channel correlation matrix, whether the connection sequence between the plurality of communications interfaces and the antenna elements is incorrect, the processing unit may be specifically configured to: determine a statistical distribution feature of the N channel correlation matrices to obtain a statistical distribution feature matrix; perform diagonal normalization processing on the statistical distribution feature matrix to obtain a normalized matrix; compare the normalized matrix with the preset channel correlation matrix; and if an error between at least one array element in the normalized matrix and an array element at a same location in the preset channel correlation matrix is not within an error range, determine that the connection sequence between the plurality of communications interfaces and the antenna elements is incorrect.

In a possible design, the preset channel correlation matrix may be:

$$\begin{bmatrix} A\left(\frac{M}{2} \times \frac{M}{2}\right) & B\left(\frac{M}{2} \times \frac{M}{2}\right) \\ B\left(\frac{M}{2} \times \frac{M}{2}\right) & A\left(\frac{M}{2} \times \frac{M}{2}\right) \end{bmatrix},$$

where $$A\left(\frac{M}{2} \times \frac{M}{2}\right)$$

is a correlation matrix between co-polarized antenna columns, M is a quantity of communications interfaces, and $$B\left(\frac{M}{2} \times \frac{M}{2}\right)$$

is a correlation matrix between cross-polarized antenna columns.

In a possible design, $$A\left(\frac{M}{2} \times \frac{M}{2}\right)$$

may conform to the following matrix:

$$\begin{bmatrix} 1 & \alpha & \cdots & \alpha^{\frac{M}{2}-1} \\ \alpha & 1 & \ddots & \vdots \\ \vdots & \ddots & 1 & \alpha \\ \alpha^{\frac{M}{2}-1} & \cdots & \alpha & 1 \end{bmatrix},$$

where
α is a correlation coefficient between adjacent co-polarized antenna columns.

In a possible design, $$B\left(\frac{M}{2} \times \frac{M}{2}\right)$$

may be a matrix in which all array elements are β, and β is a correlation coefficient between any two cross-polarized antenna columns.

According to a third aspect, this application provides a network side device. The device includes a plurality of communications interfaces and a processor, and may further include a memory, where one communications interface is connected to one antenna element. The memory is configured to store program code that needs to be executed by the processor. The communications interfaces are configured to receive, by using the connected antenna elements, reference signals sent by N terminal devices. The processor is configured to execute the program code stored in the memory, and is specifically configured to perform the method according to any one of the first aspect or the designs of the first aspect.

According to a fourth aspect, this application further provides a computer-readable storage medium, configured to store a computer software instruction used to perform a function of any one of the first aspect or the designs of the first aspect, and the computer software instruction includes a program designed to perform the method according to any one of the first aspect or the designs of the first aspect.

According to a fifth aspect, an embodiment of this application provides a computer program product including an instruction. When the computer program product runs on a computer, the computer is enabled to perform the method according to any one of the first aspect or the designs of the first aspect.

According to a sixth aspect, an embodiment of this application provides a chip. The chip is connected to a memory, and is configured to read and execute a software program stored in the memory, to implement the method according to any one of the first aspect or the designs of the first aspect.

DESCRIPTION OF EMBODIMENTS

To make the objectives, technical solutions, and advantages of this application clearer, the following further describes this application in detail with reference to the accompanying drawings.

A network architecture and a service scenario described in the embodiments of this application are intended to describe the technical solutions in the embodiments of this application clearer, and do not constitute a limitation on the technical solutions provided in the embodiments of this application. A person of ordinary skill in the art may learn that the technical solutions provided in the embodiments of this application are also applicable to a similar technical problem as the network architecture evolves and a new service scenario emerges.

Figure 3:
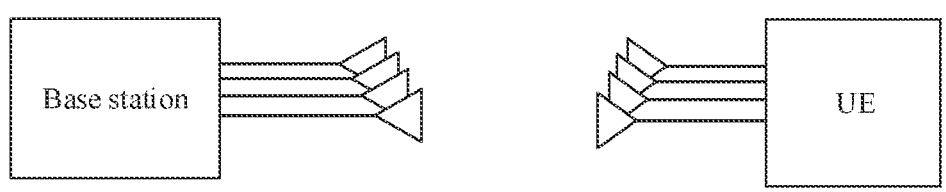
FIG. 3 is a schematic structural diagram of a MIMO system according to this application.
Figure 4:
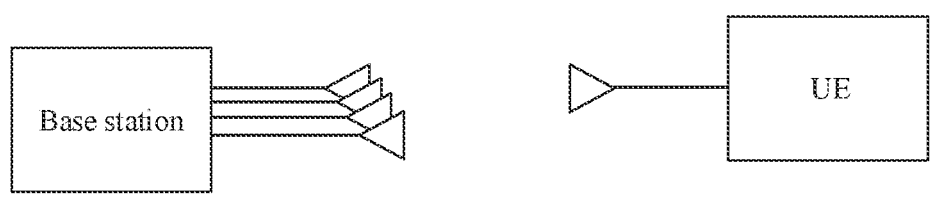
FIG. 4 is a schematic structural diagram of a MISO system according to this application.

An antenna connection detection method provided in the embodiments of this application may be applied to a communications system including a multi-antenna base station, for example, a multiple-input multiple-output (MIMO) system or a multiple-input single-output (MISO) system. In MIMO, a base station includes a plurality of antennas, and user equipment includes a plurality of antennas, as shown in FIG. 3. In the MISO system, a base station includes a plurality of antennas, and user equipment includes one antenna, as shown in FIG. 4. The communications system including the multi-antenna base station in the embodiments of this application may be various communications systems, for example, may be a long term evolution (LTE) communications system, may be a 5th generation (5G) communications system, or may be a hybrid architecture of LTE and 5G.

The base station may be a common base station (for example, a NodeB or an eNB), a new radio controller (NR controller), a gNodeB (gNB) in a 5G system, a centralized unit, a new radio base station, a remote radio module, a micro base station, a distributed unit, a transmission reception point (TRP), a transmission point (TP), or any other radio access device. The embodiments of this application are not limited thereto.

User equipment (UE), also referred to as a terminal device, is a device that provides voice and/or data connectivity for a user, for example, a handheld device or a vehicle-mounted device with a wireless connection function. A common terminal includes, for example, a mobile phone, a tablet, a notebook computer, a palmtop computer, a mobile internet device (MID), and a wearable device such as a smartwatch, a smart band, or a pedometer.

In the communications system including the multi-antenna base station, the base station includes a plurality of communications interfaces, and each communications interface is connected to one antenna element. A signal is transmitted between the base station and a terminal device through a transmission channel including a communications interface of the base station, an antenna element, and a communications interface of the terminal device. In a downlink signal transmission process, the base station outputs the signal through the communications interface of the base station, and then sends the signal to the terminal device by using the antenna element.

In the communications system including the multi-antenna base station, the base station may send data to the UE by using a MIMO beamforming (MIMO-BF) technology. In MIMO-BF, the base station weights the sent data based on downlink channel information to form a narrow transmit beam, and directs energy to target UE, thereby improving communication quality. Herein, the downlink channel information is related to a connection sequence between the communications interfaces and the antenna elements in the base station.

Figure 1:
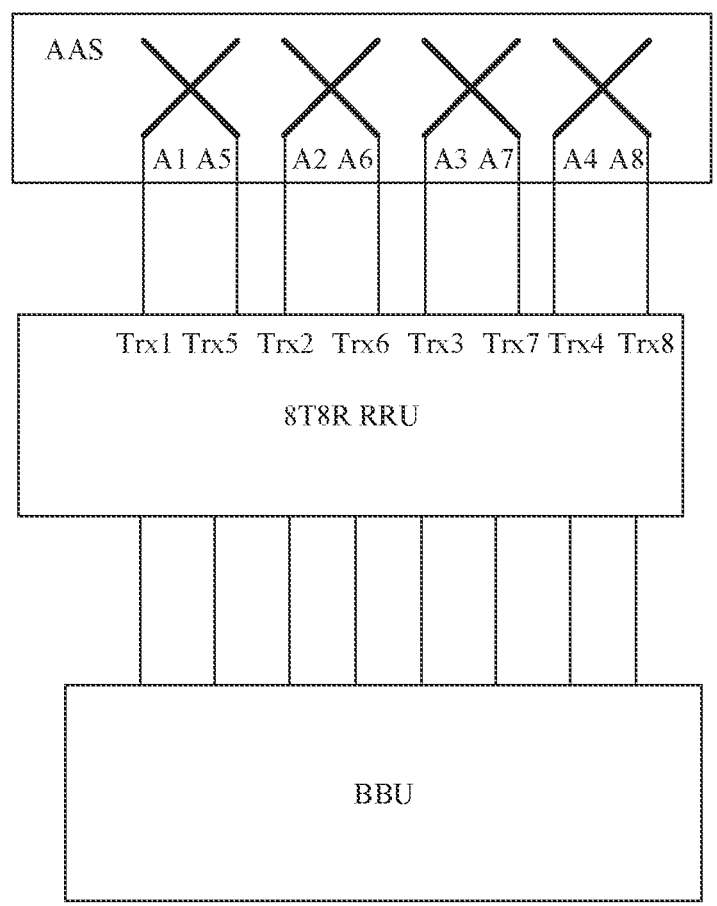
FIG. 1 is a schematic diagram of a connection sequence between communications interfaces and antenna elements according to this application.
Figure 2:
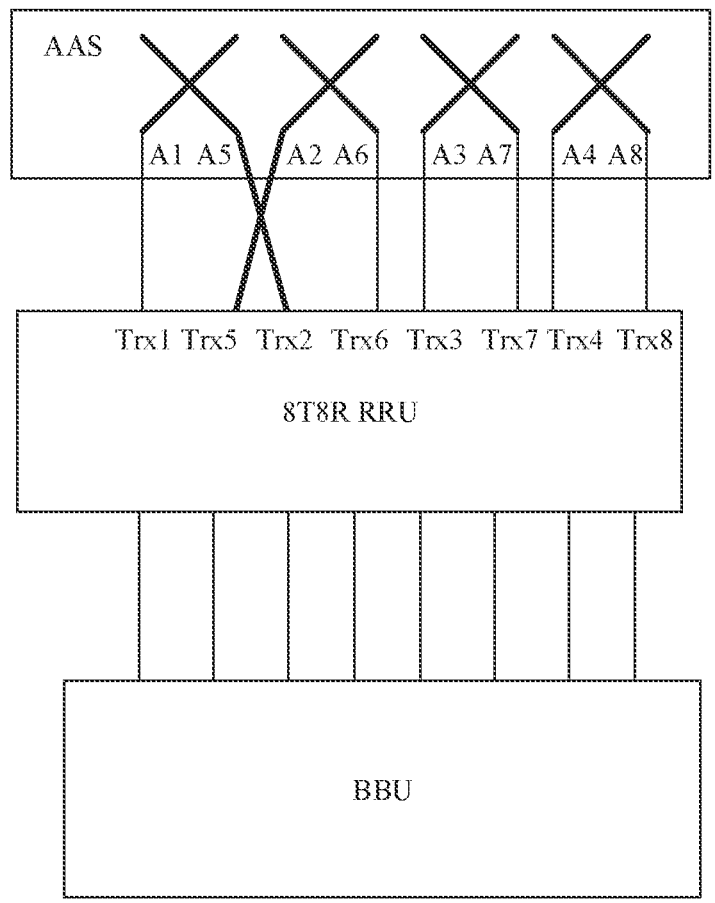
FIG. 2 is a schematic diagram of another connection sequence between communications interfaces and antenna elements according to this application.

When the base station includes a relatively large quantity of communications interfaces, the connection sequence between the communications interfaces and the antenna elements is prone to be incorrect during base station construction or base station reconstruction. For example, in the base station shown in FIG. 1, Trx5 needs to be connected to an A5 antenna element, and Trx2 needs to be connected to an A2 antenna element. However, when the communications interfaces and the antenna elements are connected, Trx5 may be incorrectly connected to the A2 antenna element, and the Trx2 may be incorrectly connected to the A5 antenna element, as shown in FIG. 2. When the connection sequence between the communications interfaces and the antenna elements is incorrect, actual downlink channel information between the base station and the UE changes because the connection sequence between the communications interfaces and the antenna elements changes. However, because the base station does not know that the downlink channel information changes, the base station forms a transmit beam based on the downlink channel information corresponding to the correct connection sequence when communicating with the UE. Consequently, directivity of the formed transmit beam deteriorates, and network performance deteriorates.

Based on this, this application provides an antenna connection detection method and apparatus, to resolve a problem in the prior art that directivity of a formed transmit beam deteriorates because a base station does not know that a connection sequence between communications interfaces and antenna elements is incorrect. The method and the apparatus are based on a same inventive concept. Because a problem-resolving principle of the method is similar to that of the apparatus, implementations of the apparatus and the method may mutually refer to each other. No repeated description is provided.

In this application, "a plurality of" refers to two or more than two.

In addition, it should be understood that, in the descriptions of this application, terms such as "first" and "second" are merely used for differentiation and description, but cannot be understood as indicating or implying relative importance, and cannot be understood as indicating or implying a sequence.

The following describes in detail the resource scheduling solution provided in this application with reference to the accompanying drawings.

Figure 5:
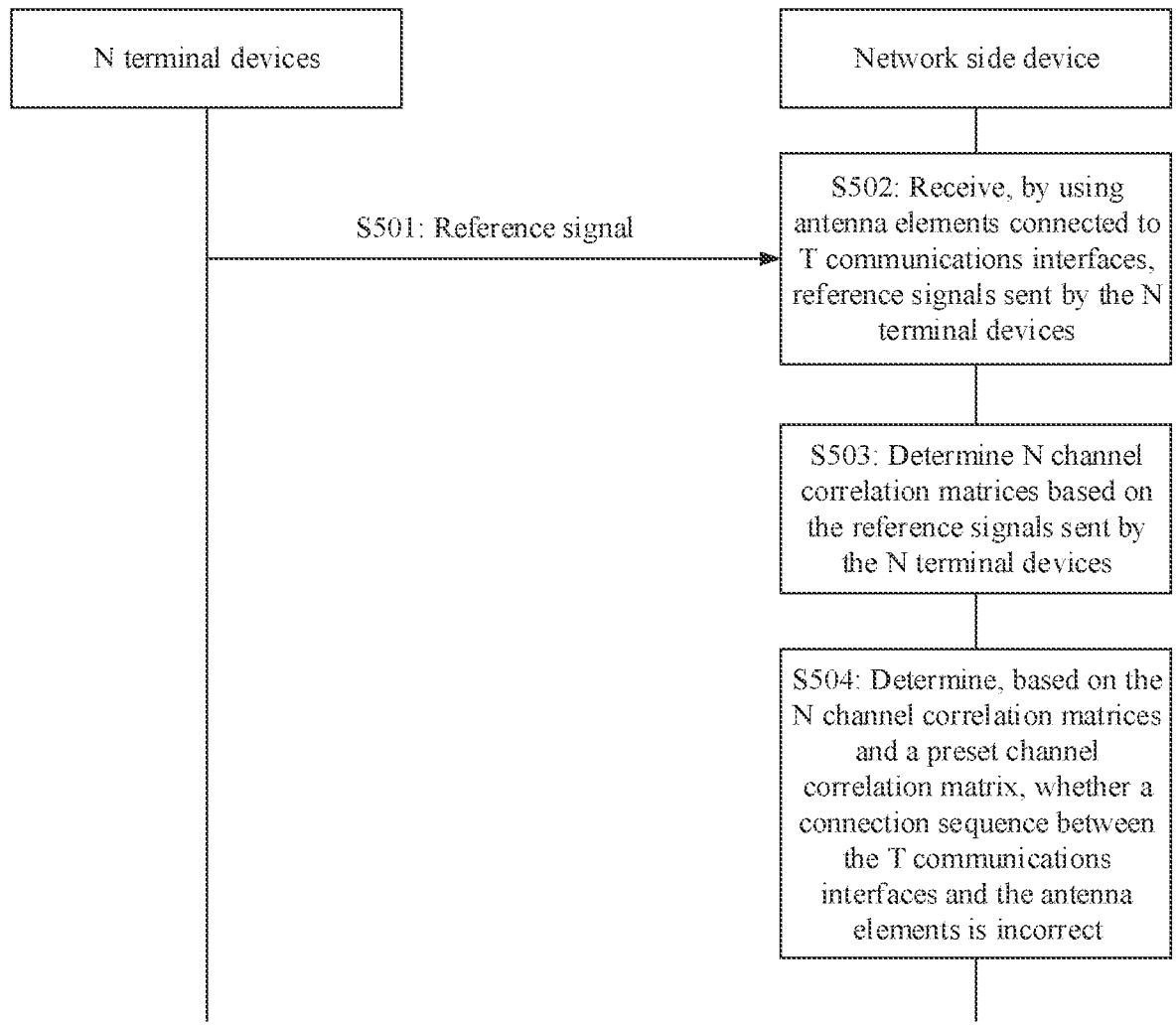
FIG. 5 is a schematic flowchart of an antenna connection detection method according to this application.

FIG. 5 is a flowchart of an antenna connection detection method according to this application. The antenna connection detection method provided in this application may be applied to a network side device in a communications system shown in FIG. 3 or FIG. 4. The communications system further includes N terminal devices, N is an integer greater than or equal to 1, the N terminal devices may be one or more terminal devices in an access cell, and the cell is served by the network side device. The network side device includes T communications interfaces, one communications interface is connected to one antenna element, and T is an integer greater than 1. FIG. 3 and FIG. 4 are merely schematic diagrams, and do not specifically limit the communications system to which the embodiments of this application are applied. The method includes the following steps.

S501: An $i^{th}$ terminal device sends a reference signal to a network side device, where i is any positive integer not greater than N. The reference signal sent by the terminal device may be a sounding reference signal (SRS), or may be a channel state information reference signal (CSI-RS), or may be a cell-specific reference signal (CRS), or certainly may be another signal. This is not specifically limited in this embodiment of this application.

S502: The network side device receives, by using antenna elements connected to T communications interfaces, reference signals sent by the N terminal devices.

S503: The network side device determines N channel correlation matrices based on the reference signals sent by the N terminal devices, where one channel correlation matrix is used to represent correlation between transmission channels between the network side device and one terminal device.

The network side device may determine the N channel correlation matrices by performing the following steps A1 and A2.

A1: First, the network side device determines an $i^{th}$ channel response matrix based on the reference signal sent by the $i^{th}$ terminal device, where i is any positive integer not greater than N, and the $i^{th}$ channel response matrix includes response coefficients of transmission channels between the network side device and the $i^{th}$ terminal device.

The it channel response matrix may be $H_i$ (a T*Q matrix), where Q is a quantity of communications interfaces included in the terminal device, and Q is an integer greater than or equal to 1. $H_i$ may be:

$$H_i = \begin{bmatrix} h0,0 & h1,0 & \cdots & hT-1,0 \\ h0,1 & \ddots & \ddots & hT-1,1 \\ \vdots & \ddots & ht,m & \vdots \\ h0,Q-1 & h1,Q-1 & \cdots & hT-1,Q-1 \end{bmatrix}.$$

A matrix element $h_{t,m}$ in a $t^{th}$ row and an $m^{th}$ column in $H_i$ represents a channel gain of an uplink channel between a $t^{th}$ communications interface of the network side device and an $m^{th}$ communications interface of the terminal device, and $h_{t,m}$ may meet a requirement of the following formula:

$$y_{t,m} = h_{t,m} \times s_{t,m} + n.$$

$y_{t,m}$ represents a reference signal received by the $t^{th}$ communications interface of the network side device from the $m^{th}$ communications interface of the terminal device, $h_{t,m}$ represents the channel gain of the uplink channel between the $t^{th}$ communications interface of the network side device and the $m^{th}$ communications interface of the terminal device, $s_{t,m}$ represents the reference signal sent by the terminal device through the $m^{th}$ communications interface, and n represents noise of the network side device.

Optionally, when determining the channel gain of the uplink channel between the $t^{th}$ communications interface of the network side device and the $m^{th}$ communications interface of the terminal device, the network side device may perform sampling for a plurality of times in time domain or frequency domain. Therefore $$h_{i,m} = [h_1, h_2, h_3, \ldots, h_r]^T = \begin{bmatrix} h_1 \\ h_2 \\ \vdots \\ h_r \end{bmatrix},$$

where 1, 2, 3, . . . , and r respectively represent sampling points in time domain or frequency domain in a unit symbol time.

A2: Then, the network side device determines an $i^{th}$ channel correlation matrix based on the $i^{th}$ channel response matrix, where the $i^{th}$ channel correlation matrix is used to represent correlation between the transmission channels between the network side device and the $i^{th}$ terminal device.

The network side device may multiply a conjugate transpose matrix of the $i^{th}$ channel response matrix by the $i^{th}$ channel response matrix, to obtain the $i^{th}$ channel correlation matrix. That is, the network side device may obtain the $i^{th}$ channel correlation matrix by using the following formula:

$$R_i = H_i^H * H_i = \begin{bmatrix} \sum_{s=0}^{Q-1} (h_{0,s})^H * h_{0,s} & \cdots & \sum_{s=0}^{Q-1} (h_{0,s})^H * h_{T-1,s} \\ \cdots & \cdots & \cdots \\ \sum_{s=0}^{Q-1} (h_{T-1,s})^H * h_{0,s} & \cdots & \sum_{s=0}^{Q-1} (h_{T-1,s})^H * h_{T-1,s} \end{bmatrix}.$$

$R_i$ represents the $i^{th}$ channel correlation matrix, $H_i^H$ represents the conjugate transpose matrix of the $i^{th}$ channel response matrix, and $H_i$ represents the $i^{th}$ channel response matrix.

S504: The network side device determines, based on the N channel correlation matrices and a preset channel correlation matrix, whether a connection sequence between the T communications interfaces and the antenna elements is incorrect.

In a possible implementation, if N is equal to 1, the network side device may determine, by performing the following steps B1 to B3, whether the connection sequence between the plurality of communications interfaces and the antenna elements is incorrect.

B1: The network side device performs diagonal normalization processing on one channel correlation matrix to obtain a normalized matrix. The network side device may perform the diagonal normalization processing on the one channel correlation matrix by using the following formula:

$R' = R/\text{diag}(R)$.

R' represents the normalized matrix corresponding to the one channel correlation matrix, and R is the one channel correlation matrix.

B2: The network side device compares the normalized matrix with the preset channel correlation matrix.

B3: If an error between at least one array element in the normalized matrix and an array element at a same location in the preset channel correlation matrix is not within an error range, the network side device determines that the connection sequence between the plurality of communications interfaces and the antenna elements is incorrect.

In another possible implementation, if N is greater than 1, the network side device may determine, by performing the following steps C1 to C3, whether the connection sequence between the plurality of communications interfaces and the antenna elements is incorrect.

C1: The network side device determines a statistical distribution feature of the N channel correlation matrices to obtain a statistical distribution feature matrix. The network side device may determine the statistical distribution feature of the N channel correlation matrices by using the following formula:

$$S = \sum_{i=1}^{N} |R_i|.$$

S represents the statistical distribution feature matrix, and $R_i$ represents the $i^{th}$ channel correlation matrix.

C2: The network side device performs diagonal normalization processing on the statistical distribution feature matrix to obtain a normalized matrix. The network side device may perform the diagonal normalization processing on the statistical distribution feature matrix by using the following formula:

$S' = S/\text{diag}(S)$.

S' represents the normalized matrix corresponding to the statistical distribution feature matrix, and S is the statistical distribution feature matrix.

C3: The network side device compares the normalized matrix with the preset channel correlation matrix.

C4: If an error between at least one array element in the normalized matrix and an array element at a same location in the preset channel correlation matrix is not within an error range, the network side device determines that the connection sequence between the plurality of communications interfaces and the antenna elements is incorrect.

In addition, after the network side device determines that the connection sequence between the plurality of communications interfaces and the antenna elements is incorrect, the network side device may prompt that the connection sequence between the communications interfaces and the antenna elements is incorrect, so that engineering personnel can correct the communications interfaces and the antenna elements that are incorrectly connected.

Certainly, in the foregoing two possible implementations, if errors between all the array elements in the normalized matrix and the array elements at a same location in the preset channel correlation matrix are all within the error range, the network side device may determine that the connection sequence between the plurality of communications interfaces and the antenna elements is correct. Further, the network side device may also prompt that the communications interfaces are correctly connected to the antenna elements, and inform the engineering personnel that the network side device can be properly used.

For example, the preset channel correlation matrix in step B2 or step C3 may be the following matrix:

$$\begin{bmatrix} A\left(\frac{M}{2} \times \frac{M}{2}\right) & B\left(\frac{M}{2} \times \frac{M}{2}\right) \\ B\left(\frac{M}{2} \times \frac{M}{2}\right) & A\left(\frac{M}{2} \times \frac{M}{2}\right) \end{bmatrix}.$$

$$A\left(\frac{M}{2} \times \frac{M}{2}\right)$$

is a correlation matrix between co-polarized antenna columns, M is a quantity of communications interfaces included in the network side device, and $$B\left(\frac{M}{2} \times \frac{M}{2}\right)$$

is a correlation matrix between cross-polarized antenna columns.

An autocorrelation coefficient of a co-polarized antenna column is 1, a correlation coefficient between adjacent co-polarized antenna columns is $\alpha$, a correlation coefficient of co-polarized antenna columns that are spaced by one column is $\alpha^2$, and a correlation coefficient between co-polarized antenna columns that are spaced by $$\frac{M}{2} - 2$$

columns is $$\alpha^{\frac{M}{2}-1},$$

so that $$A\left(\frac{M}{2} \times \frac{M}{2}\right)$$

may satisfy the following matrix:

$$\begin{bmatrix} 1 & \alpha & \cdots & \alpha^{\frac{M}{2}-1} \\ \alpha & 1 & \ddots & \vdots \\ \vdots & \ddots & 1 & \alpha \\ \alpha^{\frac{M}{2}-1} & \cdots & \alpha & 1 \end{bmatrix}.$$

α is the correlation coefficient between the adjacent co-polarized antenna columns. α may be determined by evaluating a standard antenna. For example, the correlation coefficient between the co-polarized antenna columns may be obtained by evaluating the standard antenna. As listed in Table 1, a value in an $x^{th}$ row and a $y^{th}$ column in Table 1 represents a correlation coefficient between an $x^{th}$ column antenna and a $y^{th}$ column antenna.

TABLE 1

| 1 | 0.871481 | 0.747853 | 0.675136 |
|---|---|---|---|
| 0.871481 | 1 | 0.864593 | 0.74452 |
| 0.747853 | 0.864593 | 1 | 0.848648 |
| 0.675136 | 0.74452 | 0.848648 | 1 |

According to the data listed in Table 1, it may be determined that α=0.86.

For example, all correlation coefficients between the cross-polarized antenna columns may be β. Therefore, $$B\left(\frac{M}{2} \times \frac{M}{2}\right)$$

may be matrix in which all array elements are β. Therefore, $$B\left(\frac{M}{2} \times \frac{M}{2}\right)$$

may be as follows:

$$\begin{bmatrix} \beta & \beta & \cdots & \beta \\ \beta & \beta & \ddots & \vdots \\ \vdots & \ddots & \beta & \beta \\ \beta & \cdots & \beta & \beta \end{bmatrix}.$$

β may be the correlation coefficient between any two cross-polarized antenna columns. β may be determined by evaluating a standard antenna. For example, the correlation coefficient between the cross-polarized antenna columns may be further obtained by evaluating the standard antenna. As listed in Table 2, a value in an $x^{th}$ row and a $y^{th}$ column in Table 2 represents a correlation coefficient between an $x^{th}$ column antenna and a $y^{th}$ column antenna.

TABLE 2

| 0.587246 | 0.58554 | 0.564193 | 0.494094 |
|---|---|---|---|
| 0.571774 | 0.614369 | 0.568255 | 0.531658 |
| 0.57241 | 0.58426 | 0.50849 | 0.489229 |
| 0.540001 | 0.548207 | 0.496503 | 0.479181 |

According to the data listed in Table 2, it may be determined that β=0.57.

In conclusion, in this embodiment of this application, the network side device may detect, by using the reference signals sent by the terminal devices, whether the connection sequence between the communications interfaces of the network side device and the antenna elements is incorrect, so that an incorrect connection relationship can be corrected in a timely manner. In this way, when forming a transmit beam based on downlink channel information corresponding to the correct connection sequence, the network side device can maintain relatively good network performance.

Figure 6A:
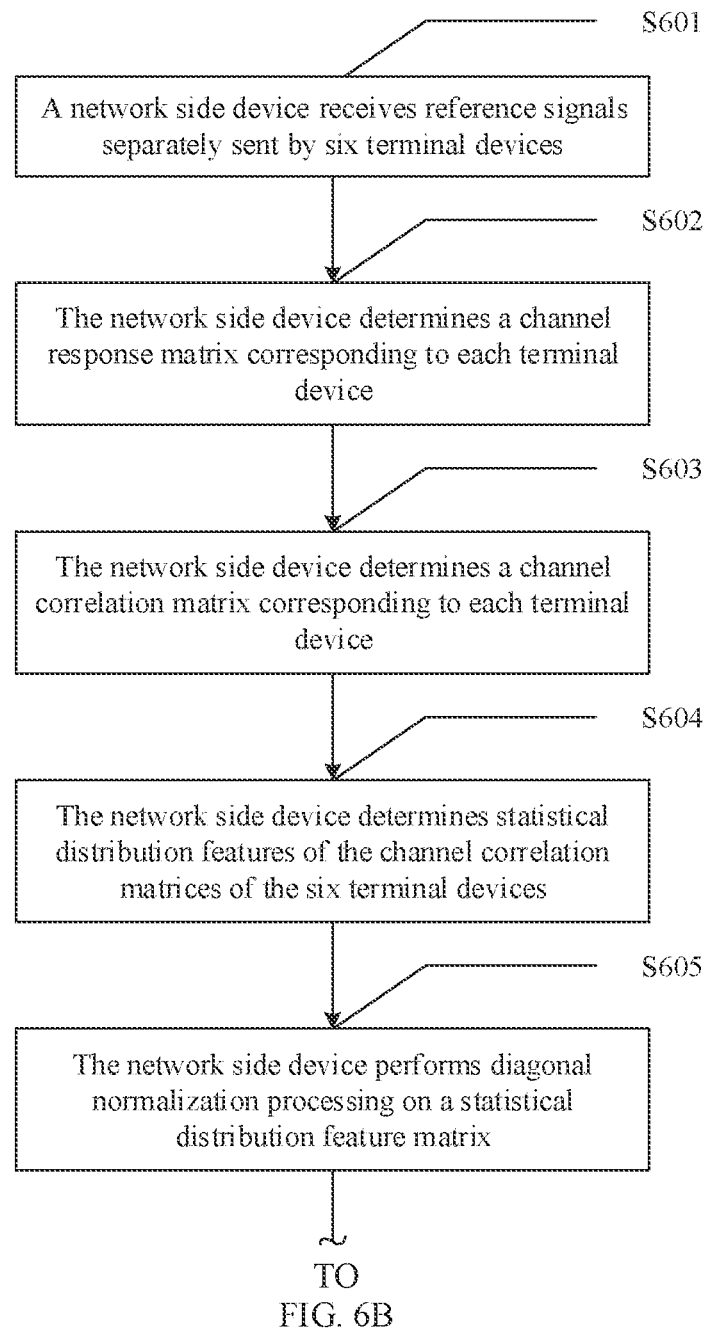
FIG. 6A and FIG. 6B are a schematic flowchart of an antenna connection detection method according to this application.
Figure 6B:
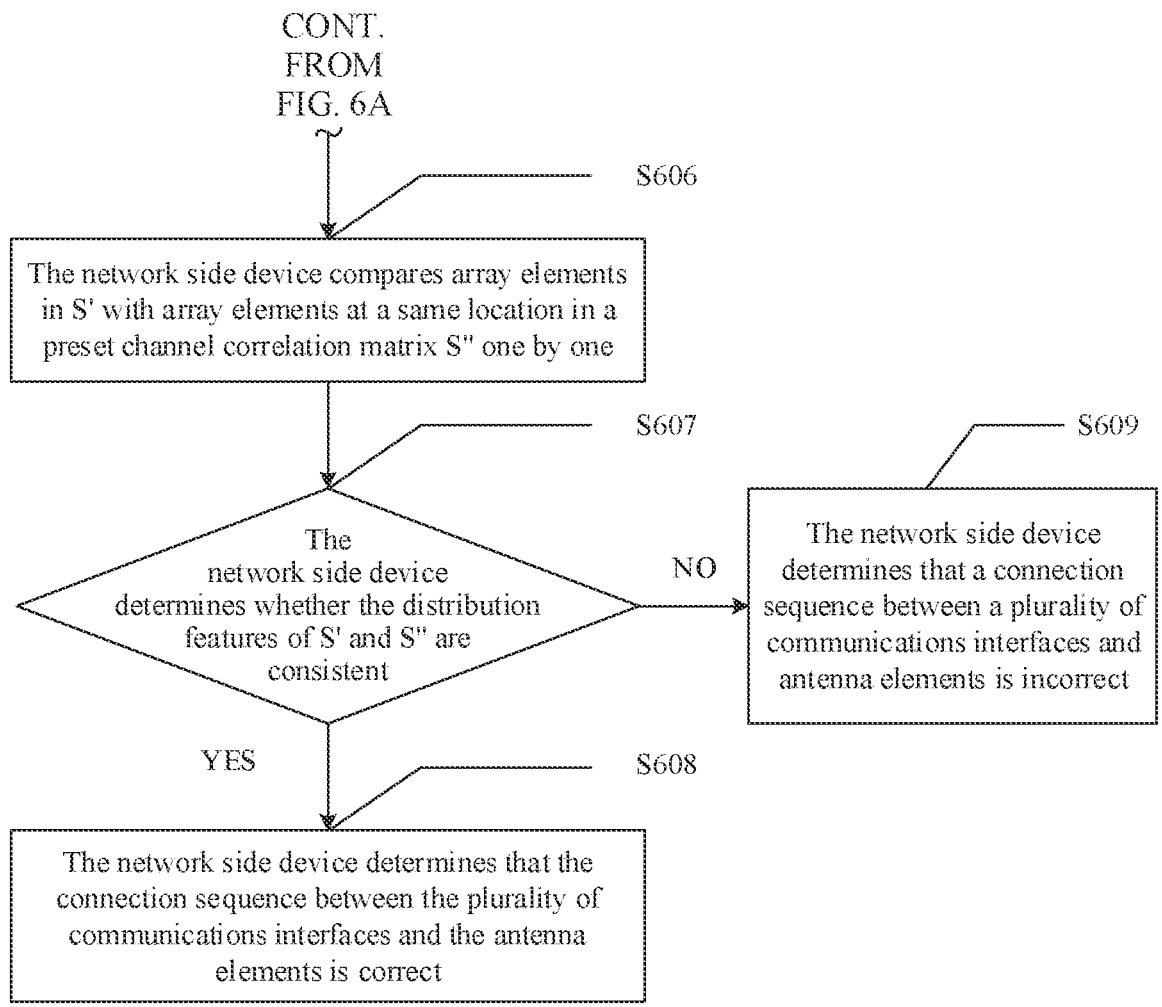

To better understand the embodiments of this application, the MIMO system shown in FIG. 3 is used as an example for description. The MIMO system includes six terminal devices including two communications interfaces and one network side device including eight communications interfaces. The following describes in detail an antenna connection sequence detection method with reference to a specific application scenario. FIG. 6A and FIG. 6B show an antenna connection sequence detection process.

S601: A network side device receives, by using antenna elements connected to eight communications interfaces, reference signals separately sent by six terminal devices. The network side device separately performs step S602 and step S603 for each of the six terminal devices.

S602: The network side device determines, by using the following formula, a channel gain $h_{q,p}$ of an uplink channel between a $q^{th}$ communications interface of the network side device and a $p^{th}$ communications interface of the terminal device, where q is any integer not greater than 8, and P is any integer not greater than 2:

$$y_{q,p} = h_{q,p} \times s_{q,p} + n.$$

$y_{q,p}$ represents a reference signal received by the $q^{th}$ communications interface of the network side device from the $p^{th}$ communications interface of the terminal device, $h_{q,p}$ represents the channel gain of the uplink channel between the $q^{th}$ communications interface of the network side device and the $p^{th}$ communications interface of the terminal device, $s_{q,p}$ represents the reference signal sent by the terminal device through the $p^{th}$ communications interface, and n represents noise of the network side device.

Therefore, the network side device may determine that a channel response matrix corresponding to the terminal device is $$H_{8,2} = \begin{bmatrix} h_{0,0} & \cdots & h_{7,0} \\ \cdots & \cdots & \cdots \\ h_{0,1} & \cdots & h_{7,1} \end{bmatrix}.$$

S603: The network side device obtains the channel correlation matrix R by using the following formula:

$$R = (H_{8,2})^H * H_{8,2} = \begin{bmatrix} \sum_{s=0}^{1}(h_{0,s})^H*h_{0,s} & \cdots & \sum_{s=0}^{1}(h_{0,s})^H*h_{7,s} \\ \cdots & \cdots & \cdots \\ \sum_{s=0}^{1}(h_{7,s})^H*h_{0,s} & \cdots & \sum_{s=0}^{1}(h_{7,s})^H*h_{7,s} \end{bmatrix}.$$

After separately performing step S602 and step S603 for each of the six terminal devices, the network side device may obtain the channel correlation matrices of the six terminal devices.

S604: The network side device determines statistical distribution features of the channel correlation matrices of the six terminal devices by using the following formula, to obtain a statistical distribution feature matrix S:

$$S = \sum_{i=1}^{6} |R_i|.$$

S605: The network side device performs diagonal normalization processing on the statistical distribution feature matrix by using the following formula, to obtain a normalized matrix S':

$S' = S/\text{diag}(S)$.

S606: The network side device compares array elements in S' with array elements at a same location in a preset channel correlation matrix S" one by one. S" may be the following matrix:

$$S'' = \begin{bmatrix} 1 & \alpha & \alpha^2 & \alpha^3 & \beta & \beta & \beta & \beta \\ \alpha & 1 & \alpha & \alpha^2 & \beta & \beta & \beta & \beta \\ \alpha^2 & \alpha & 1 & \alpha & \beta & \beta & \beta & \beta \\ \alpha^3 & \alpha^2 & \alpha & 1 & \beta & \beta & \beta & \beta \\ \beta & \beta & \beta & \beta & 1 & \alpha & \alpha^2 & \alpha^3 \\ \beta & \beta & \beta & \beta & \alpha & 1 & \alpha & \alpha^2 \\ \beta & \beta & \beta & \beta & \alpha^2 & \alpha & 1 & \alpha \\ \beta & \beta & \beta & \beta & \alpha^3 & \alpha^2 & \alpha & 1 \end{bmatrix}.$$

S607: The network side device determines whether the distribution features of S' and S" are consistent. If yes, perform step S608. If no, perform step S609. If errors between array elements in S' and array elements at a same location in S" are within an error range, it may be considered that the distribution features of S' and S" are consistent. Otherwise, it is considered that the distribution features of S' and S" are inconsistent.

S608: The network side device determines that the connection sequence between the plurality of communications interfaces and the antenna elements is correct.

S609: The network side device determines that the connection sequence between the plurality of communications interfaces and the antenna elements is incorrect.

Figure 7:
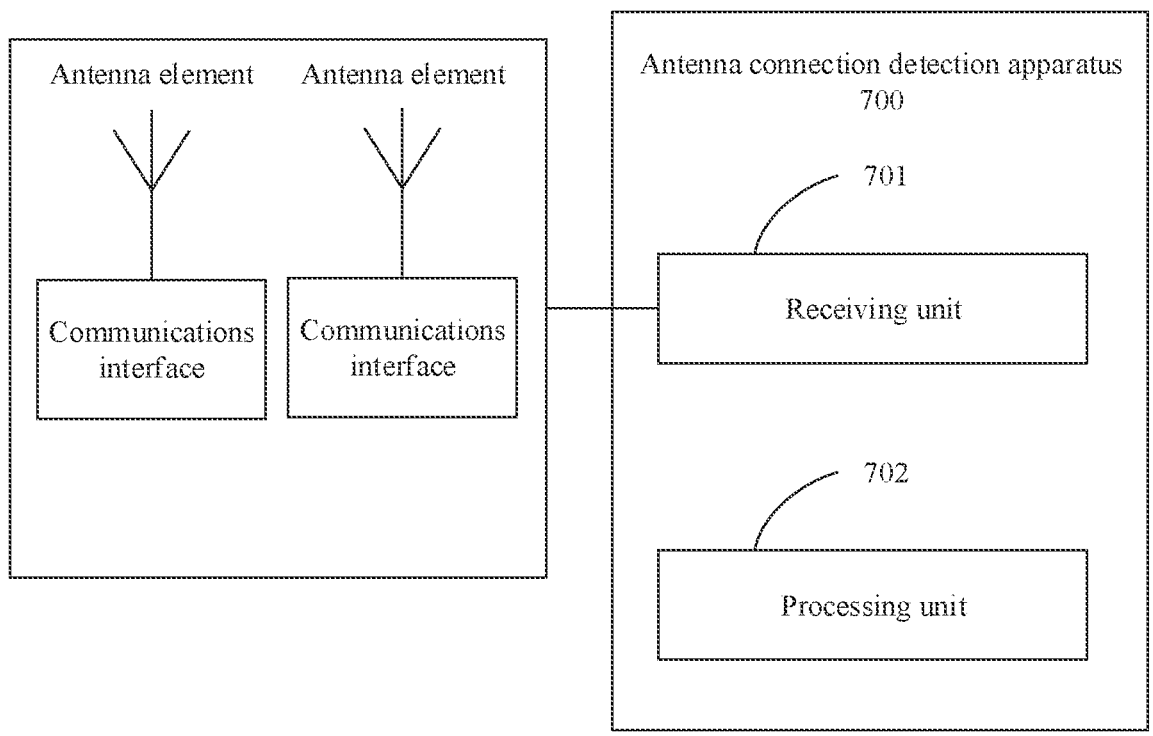
FIG. 7 is a schematic structural diagram of an antenna connection detection apparatus according to this application.

Based on a same inventive concept as that of the method embodiments, this application further provides an antenna connection detection apparatus 700. As shown in FIG. 7, the apparatus is applied to a network side device, the network side device includes a plurality of communications interfaces, one communications interface is connected to one antenna element, and the apparatus 700 includes a receiving unit 701 and a processing unit 702. The receiving unit 701 is configured to receive, by using the antenna elements connected to the plurality of communications interfaces, reference signals sent by N terminal devices, where N is an integer greater than 0. The processing unit 702 is configured to: determine N channel correlation matrices based on the reference signals that are sent by the N terminal devices and that are received by the receiving unit 701; and determine, based on the N channel correlation matrices and a preset channel correlation matrix, whether a connection sequence between the plurality of communications interfaces and the antenna elements is incorrect, where one channel correlation matrix is used to represent correlation between transmission channels between the network side device and one terminal device.

When the processing unit 702 is configured to determine the N channel correlation matrices based on the reference signals sent by the N terminal devices, the processing unit 702 may be specifically configured to: determine an $i^{th}$ channel response matrix based on a reference signal sent by an $i^{th}$ terminal device, where the $i^{th}$ channel response matrix includes response coefficients of transmission channels between the network side device and the $i^{th}$ terminal device, and i is any positive integer not greater than N; and determine an $i^{th}$ channel correlation matrix based on the $i^{th}$ channel response matrix, where the $i^{th}$ channel correlation matrix is used to represent correlation between the transmission channels between the network side device and the $i^{th}$ terminal device.

When the processing unit 702 is configured to determine the $i^{th}$ channel correlation matrix based on the $i^{th}$ channel response matrix, the processing unit 702 may be specifically configured to: multiply a conjugate transpose matrix of the $i^{th}$ channel response matrix by the $i^{th}$ channel response matrix, to obtain the it h channel correlation matrix.

In a possible implementation, if N is equal to 1, and when the processing unit 702 is configured to determine, based on the N channel correlation matrices and the preset channel correlation matrix, whether the connection sequence between the plurality of communications interfaces and the antenna elements is incorrect, the processing unit 702 may be specifically configured to: perform diagonal normalization processing on one channel correlation matrix to obtain a normalized matrix; compare the normalized matrix with the preset channel correlation matrix; and if an error between at least one array element in the normalized matrix and an array element at a same location in the preset channel correlation matrix is not within an error range, determine that the connection sequence between the plurality of communications interfaces and the antenna elements is incorrect.

In another possible implementation, if N is greater than 1, and when the processing unit 702 is configured to determine, based on the N channel correlation matrices and the preset channel correlation matrix, whether the connection sequence between the plurality of communications interfaces and the antenna elements is incorrect, the processing unit 702 may be specifically configured to: determine a statistical distribution feature of the N channel correlation matrices to obtain a statistical distribution feature matrix: perform diagonal normalization processing on the statistical distribution feature matrix to obtain a normalized matrix; compare the normalized matrix with the preset channel correlation matrix; and if an error between at least one array element in the normalized matrix and an array element at a same location in the preset channel correlation matrix is not within an error range, determine that the connection sequence between the plurality of communications interfaces and the antenna elements is incorrect.

For example, the preset channel correlation matrix may be:

$$\begin{bmatrix} A\left(\frac{M}{2} \times \frac{M}{2}\right) & B\left(\frac{M}{2} \times \frac{M}{2}\right) \\ B\left(\frac{M}{2} \times \frac{M}{2}\right) & A\left(\frac{M}{2} \times \frac{M}{2}\right) \end{bmatrix}.$$

$$A\left(\frac{M}{2} \times \frac{M}{2}\right)$$

is a correlation matrix between co-polarized antenna columns, M is a quantity of communications interfaces, and $$B\left(\frac{M}{2} \times \frac{M}{2}\right)$$

is a correlation matrix between cross-polarized antenna columns.

For example, $$A\left(\frac{M}{2} \times \frac{M}{2}\right)$$

may conform to the following matrix:

$$\begin{bmatrix} 1 & \alpha & \cdots & \alpha^{\frac{M}{2}-1} \\ \alpha & 1 & \ddots & \vdots \\ \vdots & \ddots & 1 & \alpha \\ \alpha^{\frac{M}{2}-1} & \cdots & \alpha & 1 \end{bmatrix}.$$

$\alpha$ is a correlation coefficient between adjacent co-polarized antenna columns.

For example, $$B\left(\frac{M}{2} \times \frac{M}{2}\right)$$

may be a matrix in which all array elements are $\beta$, and $\beta$ is a correlation coefficient between any two cross-polarized antenna columns.

In this embodiment of this application, the antenna connection detection apparatus may detect, by using the reference signals sent by the terminal devices, whether the connection sequence between the communications interfaces of the network side device and the antenna elements is incorrect, so that an incorrect connection relationship can be corrected in a timely manner. In this way, when forming a transmit beam based on downlink channel information corresponding to the correct connection sequence, the network side device can maintain relatively good network performance.

It can be understood that, to implement the foregoing functions, the network elements, for example, the terminal devices and the network side device, include corresponding hardware structures and/or software modules for performing the functions. A person of ordinary skill in the art should be easily aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 8:
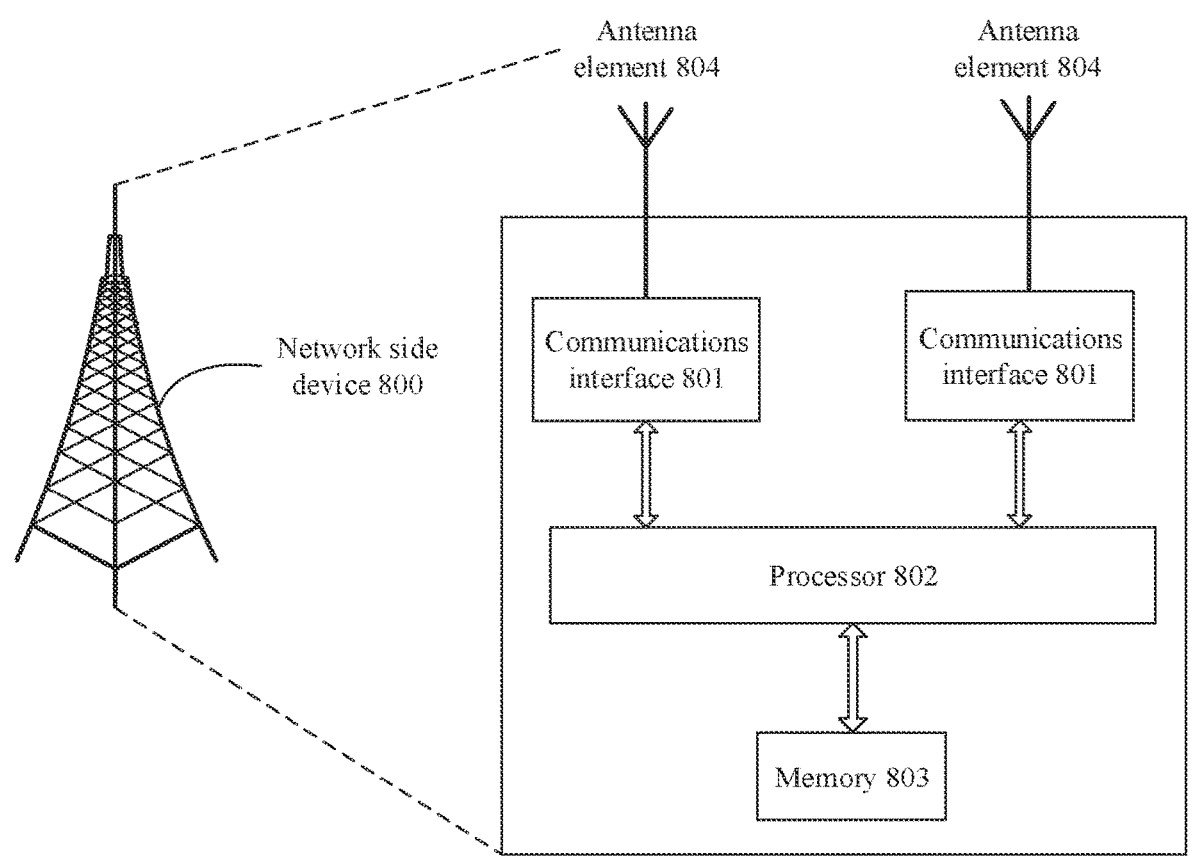
FIG. 8 is a schematic structural diagram of a network side device according to this application.

FIG. 8 is a schematic diagram of a possible structure of the network side device 800 in the foregoing embodiments.

The network side device 800 may include a plurality of communications interfaces 801, a processor 802, and a memory 803, and one communications interface 801 is connected to one antenna element 804. The communications interfaces 801 are configured to receive, by using the antenna elements 804 connected to the communications interfaces 801, reference signals sent by N terminal devices. The processor 802 may be a central processing module (CPU), a digital processing module, or the like. The memory 803 is configured to store a program executed by the processor 802. The memory 803 may be a nonvolatile memory, for example, a hard disk drive (HDD) or a solid-state drive (SSD), or may be a volatile memory, for example, a random access memory (RAM). The memory 803 is any other medium that can be configured to carry or store expected program code in a form of an instruction or a data structure and that can be accessed by a computer, but is not limited thereto. The processor 802 is configured to execute the program code stored in the memory 803, and is specifically configured to perform another operation other than data sending and receiving in the method in the embodiment shown in FIG. 5 or FIG. 6A and FIG. 6B. For details, refer to the method in the embodiments shown in FIG. 5 or FIG. 6A and FIG. 6B. Details are not described herein again in this application.

An embodiment of this application further provides a computer-readable storage medium, configured to store a computer software instruction that needs to be executed for execution of the foregoing processor, and the computer-readable storage medium includes a program that needs to be executed for execution of the foregoing processor.

An embodiment of this application provides a computer program product including an instruction. When the computer program product runs on a computer, the computer is enabled to perform the antenna connection detection method in FIG. 5 or FIG. 6A and FIG. 6B.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An antenna connection detection method, wherein the method is applied to a network side device, the network side device comprises a plurality of communications interfaces, and each communications interface is connected to one antenna element, wherein the method comprises:
   receiving, by the network side device by using antenna elements connected to the plurality of communications interfaces, reference signals sent by N terminal devices, wherein N is an integer greater than 0;
   determining, by the network side device, N channel correlation matrices based on the reference signals sent by the N terminal devices, wherein one channel correlation matrix is used to represent correlation between transmission channels between the network side device and one terminal device; and
   determining, by the network side device based on the N channel correlation matrices and a preset channel correlation matrix, whether a connection sequence between the plurality of communications interfaces and the antenna elements is incorrect.

2. The method according to claim 1, wherein the determining, by the network side device, N channel correlation matrices based on the reference signals sent by the N terminal devices comprises:
   determining, by the network side device, an it channel response matrix based on a reference signal sent by an $i^{th}$ terminal device, wherein the $i^{th}$ channel response matrix comprises response coefficients of transmission channels between the network side device and the $i^{th}$ terminal device, and i is any positive integer not greater than N; and
   determining, by the network side device, an $i^{th}$ channel correlation matrix based on the $i^{th}$ channel response matrix, wherein the $i^{th}$ channel correlation matrix is used to represent correlation between the transmission channels between the network side device and the $i^{th}$ terminal device.

3. The method according to claim 2, wherein the determining, by the network side device, an $i^{th}$ channel correlation matrix based on the $i^{th}$ channel response matrix comprises:
   multiplying, by the network side device, a conjugate transpose matrix of the $i^{th}$ channel response matrix by the $i^{th}$ channel response matrix, to obtain the $i^{th}$ channel correlation matrix.

4. The method according to claim 1, wherein N is equal to 1, and the determining, by the network side device based on the N channel correlation matrices and a preset channel correlation matrix, whether a connection sequence between the plurality of communications interfaces and the antenna elements is incorrect comprises:
   performing, by the network side device, diagonal normalization processing on one channel correlation matrix to obtain a normalized matrix;
   comparing, by the network side device, the normalized matrix with the preset channel correlation matrix; and
   if an error between at least one array element in the normalized matrix and an array element at a same location in the preset channel correlation matrix is not within an error range, determining, by the network side device, that the connection sequence between the plurality of communications interfaces and the antenna elements is incorrect.

5. The method according to claim 1, wherein N is greater than 1, and the determining, by the network side device based on the N channel correlation matrices and a preset channel correlation matrix, whether a connection sequence between the plurality of communications interfaces and the antenna elements is incorrect comprises:
   determining, by the network side device, a statistical distribution feature of the N channel correlation matrices to obtain a statistical distribution feature matrix:
   performing, by the network side device, diagonal normalization processing on the statistical distribution feature matrix to obtain a normalized matrix;
   comparing, by the network side device, the normalized matrix with the preset channel correlation matrix; and
   if an error between at least one array element in the normalized matrix and an array element at a same location in the preset channel correlation matrix is not within an error range, determining, by the network side device, that the connection sequence between the plurality of communications interfaces and the antenna elements is incorrect.

6. The method according to claim 1, wherein the preset channel correlation matrix is:

$$\begin{bmatrix} A\left(\frac{M}{2} \times \frac{M}{2}\right) & B\left(\frac{M}{2} \times \frac{M}{2}\right) \\ B\left(\frac{M}{2} \times \frac{M}{2}\right) & A\left(\frac{M}{2} \times \frac{M}{2}\right) \end{bmatrix},$$

wherein $A\left(\frac{M}{2} \times \frac{M}{2}\right)$ is a correlation matrix between co-polarized antenna columns, M is a quantity of communications interfaces, and $B\left(\frac{M}{2} \times \frac{M}{2}\right)$ is a correlation matrix between cross-polarized antenna columns.

7. The method according to claim 6, wherein $A\left(\frac{M}{2} \times \frac{M}{2}\right)$ conforms to the following matrix:

$$\begin{bmatrix} 1 & \alpha & \cdots & \alpha^{\frac{M}{2}-1} \\ \alpha & 1 & \ddots & \vdots \\ \vdots & \ddots & 1 & \alpha \\ \alpha^{\frac{M}{2}-1} & \cdots & \alpha & 1 \end{bmatrix},$$

wherein
α is a correlation coefficient between adjacent co-polarized antenna columns.

8. The method according to claim 6, wherein $B\left(\frac{M}{2} \times \frac{M}{2}\right)$ is a matrix in which all array elements are β, and β is a correlation coefficient between any two cross-polarized antennas columns.

9. A network side device, wherein the device comprises:
a plurality of communications interfaces and at least one processor, wherein one communications interface is connected to one antenna element:
the plurality of communications interfaces are configured to receive, by using antenna elements connected to the plurality of communications interfaces, reference signals sent by N terminal devices, wherein N is an integer greater than 0; and
the at least one processor is configured to determine N channel correlation matrices based on the reference signals that are sent by the N terminal devices and that are received by the plurality of communications interfaces, wherein one channel correlation matrix is used to represent correlation between transmission channels between the network side device and one terminal device; and determine, based on the N channel correlation matrices and a preset channel correlation matrix, whether a connection sequence between the plurality of communications interfaces and the antenna elements is incorrect.

10. The device according to claim 9, wherein when the at least one processor is configured to determine the N channel correlation matrices based on the reference signals sent by the N terminal devices, the at least one processor is configured to:
determine an $i^{th}$ channel response matrix based on a reference signal sent by an $i^{th}$ terminal device, wherein the $i^{th}$ channel response matrix comprises response coefficients of transmission channels between the network side device and the $i^{th}$ terminal device, and i is any positive integer not greater than N; and
determine an $i^{th}$ channel correlation matrix based on the $i^{th}$ channel response matrix, wherein the $i^{th}$ channel correlation matrix is used to represent correlation between the transmission channels between the network side device and the $i^{th}$ terminal device.

11. The device according to claim 10, wherein when the at least one processor is configured to determine the $i^{th}$ channel correlation matrix based on the $i^{th}$ channel response matrix, the at least one processor is configured to:
multiply a conjugate transpose matrix of the $i^{th}$ channel response matrix by the $i^{th}$ channel response matrix, to obtain the it channel correlation matrix.

12. The device according to claim 9, wherein N is equal to 1, and when the at least one processor is configured to determine, based on the N channel correlation matrices and the preset channel correlation matrix, whether the connection sequence between the plurality of communications interfaces and the antenna elements is incorrect, the processor is specifically configured to:
perform diagonal normalization processing on one channel correlation matrix to obtain a normalized matrix;
compare the normalized matrix with the preset channel correlation matrix; and
if an error between at least one array element in the normalized matrix and an array element at a same location in the preset channel correlation matrix is not within an error range, determine that the connection sequence between the plurality of communications interfaces and the antenna elements is incorrect.

13. The device according to claim 9, wherein N is greater than 1, and when the at least one processor is configured to determine, based on the N channel correlation matrices and the preset channel correlation matrix, whether the connection sequence between the plurality of communications interfaces and the antenna elements is incorrect, the at least one processor is configured to:
determine a statistical distribution feature of the N channel correlation matrices to obtain a statistical distribution feature matrix;
perform diagonal normalization processing on the statistical distribution feature matrix to obtain a normalized matrix;
compare the normalized matrix with the preset channel correlation matrix; and
if an error between at least one array element in the normalized matrix and an array element at a same location in the preset channel correlation matrix is not within an error range, determine that the connection sequence between the plurality of communications interfaces and the antenna elements is incorrect.

14. The device according to claim 9, wherein the preset channel correlation matrix is:

$$\begin{bmatrix} A\left(\frac{M}{2} \times \frac{M}{2}\right) & B\left(\frac{M}{2} \times \frac{M}{2}\right) \\ B\left(\frac{M}{2} \times \frac{M}{2}\right) & A\left(\frac{M}{2} \times \frac{M}{2}\right) \end{bmatrix},$$

wherein $$A\left(\frac{M}{2} \times \frac{M}{2}\right)$$

is a correlation matrix between co-polarized antenna columns, M is a quantity of communications interfaces, and $$B\left(\frac{M}{2} \times \frac{M}{2}\right)$$

is a correlation matrix between cross-polarized antenna columns.

15. The device according to claim 14, wherein $$A\left(\frac{M}{2} \times \frac{M}{2}\right)$$

conforms to the following matrix:

$$\begin{bmatrix} 1 & \alpha & \cdots & \alpha^{\frac{M}{2}-1} \\ \alpha & 1 & \ddots & \vdots \\ \vdots & \ddots & 1 & \alpha \\ \alpha^{\frac{M}{2}-1} & \cdots & \alpha & 1 \end{bmatrix},$$

wherein
α is a correlation coefficient between adjacent co-polarized antenna columns.

16. The device according to claim 14, wherein $$B\left(\frac{M}{2} \times \frac{M}{2}\right)$$

is a matrix in which all array elements are β, and β is a correlation coefficient between any two cross-polarized antennas columns.

\* \* \* \* \*